(12) United States Patent
Dal Bo et al.

(10) Patent No.: US 7,288,744 B2
(45) Date of Patent: Oct. 30, 2007

(54) INJECTOR FOR EQUIPMENT FOR INJECTION MOULDING OF PLASTIC MATERIALS

(75) Inventors: Peter Dal Bo, Vittorio Veneto (Treviso) (IT); Nico Trevisiol, Maserada sul Piave (Treviso) (IT)

(73) Assignee: Inglass S.P.A., San Polo Di Piave (Treviso) (IT)

( * ) Notice: Subject to any disclaimer, the term of this patent is extended or adjusted under 35 U.S.C. 154(b) by 133 days.

(21) Appl. No.: 11/236,443

(22) Filed: Sep. 27, 2005

(65) Prior Publication Data
US 2006/0081590 A1 Apr. 20, 2006

(30) Foreign Application Priority Data
Oct. 15, 2004 (IT) .......................... TO2004A0717

(51) Int. Cl.
*B29C 45/20* (2006.01)
*B29C 45/74* (2006.01)
*H05B 3/42* (2006.01)
*H05B 3/48* (2006.01)

(52) U.S. Cl. ...................... 219/422; 219/424; 219/426; 219/534; 425/548; 425/549

(58) Field of Classification Search ...................... None
See application file for complete search history.

(56) References Cited

U.S. PATENT DOCUMENTS

| | | | |
|---|---|---|---|
| 4,721,847 A * | 1/1988 | Leverenz | 219/421 |
| 4,875,845 A * | 10/1989 | Hara et al. | 425/549 |
| 5,113,576 A * | 5/1992 | van Boekel et al. | 29/611 |
| 6,104,006 A * | 8/2000 | Kimura et al. | 219/422 |
| 6,323,465 B1 * | 11/2001 | Gellert et al. | 219/421 |
| 6,495,804 B2 * | 12/2002 | Zahradnik | 219/421 |
| 7,071,449 B2 * | 7/2006 | Godwin et al. | 219/426 |
| 2002/0160075 A1 * | 10/2002 | Bazzo et al. | 425/549 |
| 2003/0228390 A1 * | 12/2003 | Gellert et al. | 425/549 |
| 2004/0091566 A1 * | 5/2004 | Olaru | 425/549 |
| 2005/0104242 A1 * | 5/2005 | Olaru | 264/328.15 |

FOREIGN PATENT DOCUMENTS

EP  1252998 A2 * 10/2002

OTHER PUBLICATIONS

U.S. Appl. No. 11/176,408, filed Jul. 7, 2005, Bazzo et al.

* cited by examiner

*Primary Examiner*—Joseph Pelham
(74) *Attorney, Agent, or Firm*—Heslin Rothenberg Farley & Mesiti P.C.; Victor A. Cardona, Esq.

(57) ABSTRACT

An injector for equipment for injection moulding of plastic materials comprising at least one first heating resistor and at least one second heating resistor, which are controlled independently of one another and of which one is wound on a first area of the body of the injector extending substantially throughout the axial extension thereof and the other is wound on a second area that extends only along an axial portion of the body of the injector starting from a substantially intermediate area thereof.

3 Claims, 2 Drawing Sheets

FIG. 1
FIG. 3
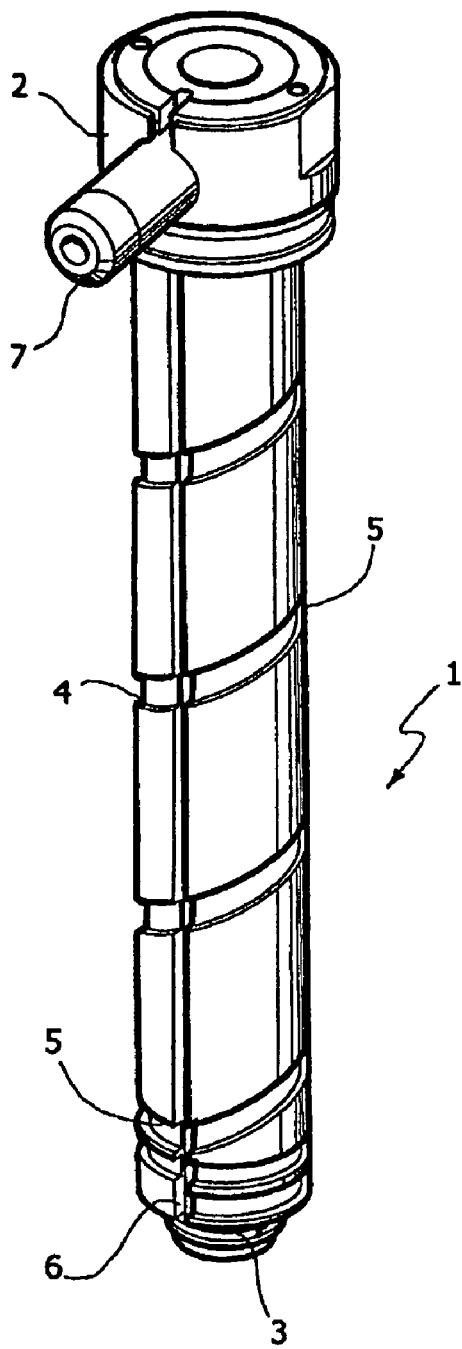
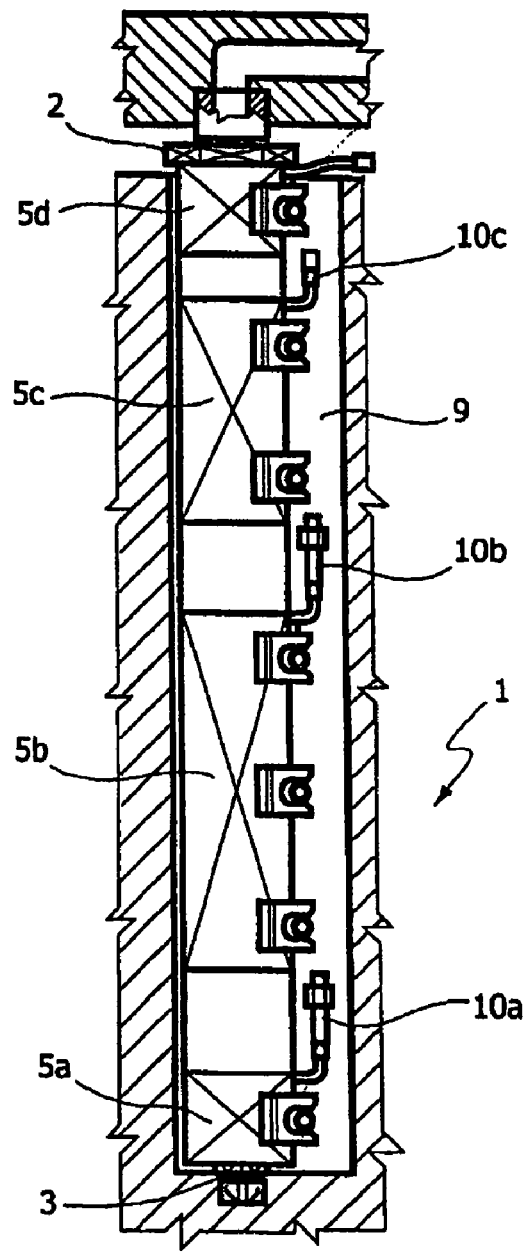
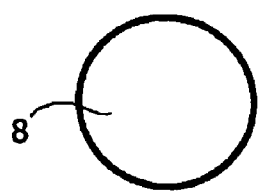
FIG. 2
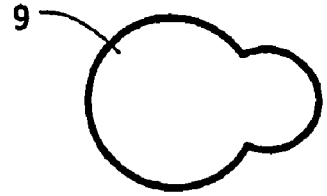
FIG. 4

INJECTOR FOR EQUIPMENT FOR INJECTION MOULDING OF PLASTIC MATERIALS

CROSS-REFERENCE TO RELATED APPLICATIONS

This application claims priority from Italian Patent Application No. TO2004A000717, filed Oct. 15, 2004, the entire disclosure of which is incorporated herein by reference.

FIELD OF THE INVENTION

The present invention relates in general to equipment for injection moulding of plastic materials, and regards, more in particular, an injector for said equipment, of the type comprising a generally cylindrical body wound on which are electrical resistor means for heating associated to which are thermocouple control means.

STATE OF THE PRIOR ART

FIG. 1 of the annexed plate of drawings illustrates an injector of this sort according to the known art, produced and marketed for some time by the present applicant. The generally cylindrical body 1 of the injector extends between a head end 2 and a tip end 3 and has a generally helical outer groove 4, housed within which is an electrical heating resistor 5, the control thermocouple of which, located in the position designated by 6, is set in the proximity of the tip end 3. Instead of housing a single resistor 5, the groove 4 can house a pair of resistors set alongside one another (or even on top of one another) independent of one another, in conformance with what is described and illustrated in the European patent No. EP-B-1252998. The heating resistor 5 or each heating resistor 5 is wound along the entire the axial extension of the body 1 between the head end 2 and the tip end 3 and is supplied in a way in itself known via electrical conductors (not illustrated) that traverse a radial tubular appendage 7 projecting from the head end 2.

In the case where two resistors 5 are provided, associated to each of them will be a respective independent thermocouple, and both of the thermocouples will be positioned in the same area designated by 6.

With this arrangement, the resistor or resistors 5 heat the body 1 of the injector in a homogeneous way throughout its axial extension.

In some cases, however, the axial dimension of the body 1 can even be considerable, a fact that involves heating the area corresponding to the tip end 3 independently of the central area of the body 1. This derives from the need to maintain the temperature as uniform as possible: the area of the tip end 3 is, in fact, in use, in contact with the mould and, on account of heat dissipation, calls for a more intense heating. The central area, instead, which not only is not in direct contact with the mould but rather is normally surrounded by an air gap that insulates it, tends instead to accumulate heat.

FIG. 2 of the annexed plate of drawings is a schematic illustration of the cross-sectional shape of the seat of the mould within which the body 1 of the injector is housed. As may be seen, said shape is simply circular.

To solve the technical problem defined above solutions have been proposed, such as the one represented in FIG. 3, in which applied on the body 1 of the injector are various heating-resistor bands 5a, 5b, 5c, 5d, which can be controlled independently. In these solutions, the electrical conductors for supply of the bands 5a, 5b and 5c, designated respectively by 6a, 6b and 6c, project radially on the outside of the body 1. This entails the need to provide the seat within the mould for the injector with the cross-sectional shape represented in FIG. 4, which, in turn, entails relatively complex machining operations of the mould itself.

SUMMARY OF THE INVENTION

The object of the present invention is to solve the technical problem defined at the beginning of the present description, overcoming the drawbacks of the known art outlined above.

According to the invention, this object is achieved thanks to the fact that in an injector of the type specified above, in which the aforesaid resistor means include at least one first resistor for heating a first area of the body and at least one second resistor for heating a second area of the body, the aforesaid first area of the body of the injector on which said at least one first resistor is wound extends substantially along the entire axial extension of the body, and said second area on which said at least one second resistor is wound extends only along an axial portion of the body of the injector.

Said second axial portion along which the aforesaid at least one second resistor is wound is normally comprised between the head end and a substantially intermediate area of the body at a distance from its tip end. In this case, the control thermocouple associated to the aforesaid at least one second resistor is positioned in an area corresponding to said substantially intermediate area of the body, whilst the control thermocouple of the aforesaid at least one first resistor will normally be located in the proximity of the tip end of the body of the injector.

Thanks to this idea of solution, the electrical conductors for supply of the heating resistors and of the corresponding thermocouples can come under the head end of the body of the injector, with the advantage of not entailing modifications of the seat of the mould within which the injector is housed, said seat not requiring any supplementary machining operations and rather corresponding in shape and size to the existing seats for the conventional injectors illustrated previously with reference to FIGS. 1 and 2. Consequently, the injector according to the invention can directly and immediately replace existing injectors on moulds that are already operative.

BRIEF DESCRIPTION OF THE DRAWINGS

The invention will now be described in detail with reference to an embodiment, which is to be considered merely as a non-limiting example.

In the plate of drawings:

FIG. 1 is a simplified schematic perspective view of an injector according to a first known technique;

FIG. 2 is a schematic illustration of the cross section of the seat of the mould for housing the injector of FIG. 1;

FIG. 3 is a schematic elevation of an injector according to a second known technique;

FIG. 4 is a view similar to that FIG. 2 and is a schematic illustration of the cross section of the seat of the mould for housing the injector of FIG. 3;

DETAILED DESCRIPTION OF THE INVENTION

Figure 5:
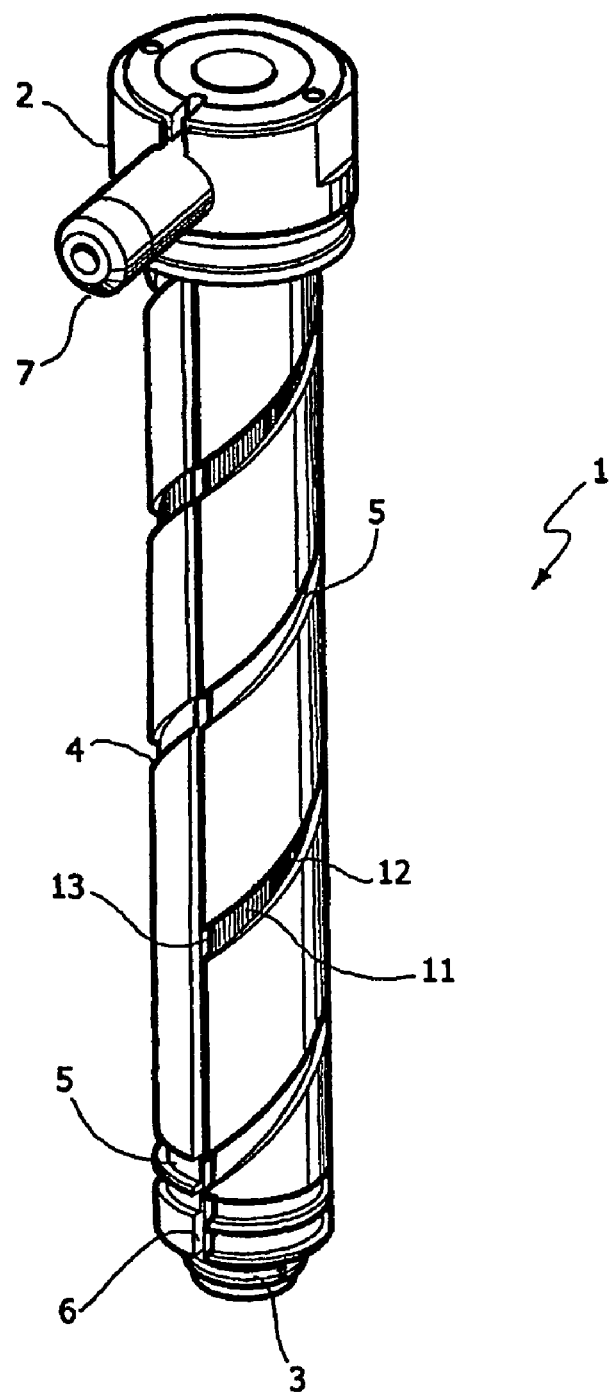
FIG. 5 is a view similar to that of FIG. 1 that shows an injector according to the invention.

As depicted in FIG. 5, in which parts that are identical or similar to the ones already described with reference to FIG. 1 are designated by the same reference numbers, a first electrical heating resistor 5 (or a pair of first resistors set alongside one another or on top of one another) is inserted within a variable-pitch helical groove 4, which extends for the entire axial length of the body 1, between the head end 2 and the tip end 3, and is controlled by the thermocouple set in the position designated by 6, i.e., adjacent to said tip end 3. A second heating resistor 11 (or a pair of second heating resistors set alongside or on top of one another), independent of the first resistor 5, is housed within a second helical groove 12 of the body 1 and extends only along an axial portion thereof, comprised between the head end 2 and a substantially intermediate area set at a distance from the tip end 3. The second heating resistor 11 is controlled by an autonomous thermocouple 13 set in a position corresponding to said intermediate area of the body 1.

Figure 6:
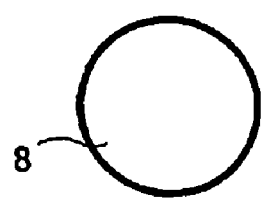
FIG. 6 is a view similar to those of FIGS. 2 and 4, which shows the seat of the mould for housing the injector according to FIG. 5.

With this arrangement, the area of the tip end 3 can be heated by the first resistor 5 independently of the central area of the body 1. Furthermore, the electrical conductors for supply both of the resistor or resistors 5 and of the resistor or resistors 11, as well as of the corresponding control thermocouples 6 and 13, can all come under the lateral appendage 7 of the head end 2, which does not entail radial projections along the extension of the body 1 (unlike what has been described with reference to the known art in FIG. 3), with the advantage of not requiring any modification of the seat of the mould for housing the injector, the cross section 8 of which, represented schematically in FIG. 6, will have a circular shape and dimensions identical to those represented in FIG. 2 with reference to the known art of FIG. 1. No modifications of the mould for housing the injector according to the invention are consequently required, it being hence possible, if necessary, for the injector according to the invention to replace easily the injector according to the known art of FIG. 1.

Of course, the details of construction and the embodiments may vary widely with respect to what is described and illustrated herein, without thereby departing from the scope of the present invention, as defined in the ensuing claims.

Thus, for example, instead of just two areas for control of the temperature there may provided even three (or more) set along the body 1 of the injector, in particular for heating—according to a variant not illustrated—with a third independent resistor (or pair of resistors) the area of the head end 2.

What is claimed is:

1. An injector for equipment for injection moulding of plastic materials, comprising a generally cylindrical body, wound on which are electrical heating resistor means coupled to thermocouple control means, and wherein said resistor means include at least one first resistor for heating a first area of the body and at least one second resistor for heating a second area of the body, said at least one first resistor and said at least one second resistor being controlled independently of one another, wherein said first area on which said at least one first resistor is wound extends substantially throughout the axial extension of the body, and said second area on which said at least one second resistor is wound extends only along an axial portion of the body of the injector;

wherein said body has a head end and a tip end, said axial portion of the body along which said at least one second resistor is wound extending between said head end and a substantially intermediate area of the body set at a distance from said tip end, said intermediate area located closer to said head end than the extension of said first area throughout the axial extension of the body.

2. The injector according to claim 1, wherein said thermocouple control means include a first thermocouple associated to said at least one first resistor and positioned in the proximity of said tip end, and a second thermocouple associated to said at least one second resistor, said second thermocouple being independent of said first thermocouple and being positioned in an area corresponding to said substantially intermediate area of the body.

3. The injector according to claim 1, further including at least one third resistor, independent of said at least one first resistor and said at least one second resistor, set in the area of said head end of the body of the injector.

* * * * *